_United States Patent Office_

2,984,639
Patented May 16, 1961

2,984,639

COMPOSITION COMPRISING THE REACTION PRODUCT OF A QUATERNARY AMMONIUM COMPOUND AND A POLYMER OF ETHYLENICALLY UNSATURATED MONOMER

Paul Stamberger, Stamford, Conn., and Walter M. Fuchs, Aachen, Germany; Frieda W. Fuchs, sole heir and personal representative of said Walter M. Fuchs, deceased, assignor to Crusader Chemical Co., Inc., New York, N.Y., a corporation of New York No Drawing. Filed Dec. 31, 1953, Ser. No. 401,735

8 Claims. (Cl. 260—32.4)

This application is a continuation-in-part of our applications Serial No. 70,805, filed January 13, 1949, and Serial No. 368,832, filed July 17, 1953. This application is directed particularly to water-insoluble germicidal compositions, capable of film formation, formed by reacting germicidal quaternary ammonium compounds with synthetic polymers containing an active hydrogen capable of salt formation with the quaternary ammonium compound, the polymers being high molecular weight homo- or copolymers derived from ethylenically unsaturated compounds (e.g. vinyl esters and ethers, acrylates and methacrylate, styrene etc.).

As pointed out in our copending application, salts of quaternary ammonium bases with high molecular weight acids have been described by De Groote, U.S. Patent 2,087,506 (1937), as softening, cleansing, detergent, emulsifying, wetting, and levelling agents. These quaternary ammonium bases are characterized by simultaneous presence of an alkylol radical and an alkyl radical having from two to six carbon atoms. Compounds of this type are neither claimed nor known to act as germicidal agents.

Water-soluble quaternary ammonium salts with at least one hydrocarbon radical of more than ten carbon atoms are known to exhibit remarkable anti-bacterial effects. Such compounds have been termed invert soaps because they contain a long hydrocarbon chain, as is characteristic of soaps, as component of a cation, while soaps contain a long hydrocarbon chain as component of an anion.

In aqueous solution, the strong germicidal effect of invert soaps is counteracted and even cancelled by soaps, and also by proteins, resins, and the like. For instance, Shelton, U.S. Patent 2,380,877 (1945), describes quaternary ammonium compounds of germicidal action of the general formula $N(R_1R_2R_3R_4)X$, and says: "The higher fatty acids for X give the poorest results, especially in aqueous compositions, and usually give relatively insoluble salts, and for this reason fatty acids and fatty acid soaps should be avoided in using compositions of my invention."

In contrast to the above, it has now been found that the practically water-insoluble germicidal quaternary ammonium compounds of the present invention are efficient under conditions where water-soluble derivatives of the same quaternary ammonium compounds are inapplicable, inefficient or even undesirable.

The present invention involves water-insoluble, germicidal compounds which are also soluble in commonly used organic solvents, and which are formed by reacting a suitable quaternary ammonium compound with a synthetic polymer containing active hydrogen capable of salt formation with the quaternary ammonium compound; the polymer is characterized by being derived from an ethylenically unsaturated compound, either containing the salt-forming radical itself, or copolymerized with some unsaturated compound having the salt-forming group.

Typical of the polymers which are useful in our invention are the following:

Polyacrylic acid and, salts thereof
Polymethacrylic acid
Styrene maleic acid copolymers
Vinyl ester or ether copolymers with maleic or crotonic acid
Polyvinyl pyrrolidone-acrylonitrile copolymers The quaternary ammonium compounds used in preparing the compounds of our invention may be any of those which have known germicidal properties in and of themselves. Most preferably, for use in our invention, they have, as one of the substituents in the quaternary ammonium radical, a long chain group containing more than 10 carbon atoms in the chain. These substituents in the quaternary ammonium compounds have the property of internally plasticizing the resultant compound, to yield film formers of much improved properties.

The long chain substituents may be attached directly to the nitrogen, or they may be attached elsewhere in the ring, where the nitrogen is present in a heterocyclic ring (as pyridinium, quinolinium and imidazolinium compounds).

The compounds of the invention are formed by reacting water-soluble salts of the above mentioned high molecular weight polymeric compounds with water-soluble salts of germicidal quaternary ammonium compounds, and also by neutralization of quaternary ammonium bases with the salt-forming high molecular weight polymeric compounds. The reactions are exemplified by the following equations:

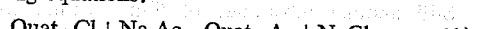
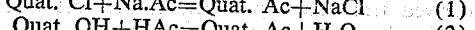

Quat. Cl+Na.Ac=Quat. Ac+NaCl     (1)
Quat. OH+HAc=Quat. Ac+H$_2$O     (2)

In these equations, the symbol, "Quat." indicates the cation of a quaternary ammonium compound or an invert soap and the symbol "Ac" indicates the anion or radical of the high molecular salt-forming compound. While in Equation 1 only Na salts are referred to, it will be understood that the reaction is not limited to sodium salts and, in general, all water-soluble salts of Ac can be used.

The reaction can be carried out either in aqueous medium or in an organic solvent, such as methyl or ethyl alcohol, which dissolves both reactants. The organic solvent method has the advantage of directly producing a solution of the compound, ready for use.

Quaternary ammonium compounds which we have used for preparing our compounds fall into two groups. In one group, we have the formula

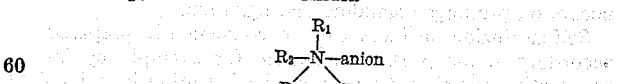

in which $R_1$ is hydrogen, lower alkyl or lower alkylol, $R_2$ is lower alkyl or lower alkylol, $R_3$ is alkyl, alkylol aryl or aralkyl and $R_4$ is the long chain substituent containing more than ten carbon atoms. In this group we have used, among others, cetyl-dimethyl-benzyl-ammonium chloride, trimethyl-cetyl-ammonium bromide, diisobutyl phenoxy ethoxy ethyl-dimethyl-benzyl-ammonium chloride, 9 octadecenyl-dimethyl-ethyl-ammonium chloride, dodecyl-dimethyl-o-chlor benzyl-ammonium chloride, dodecyl-dimethyl-benzyl-ammonium chloride, didodecyl-dimethyl-ammonium chloride, p-tertiary octyl phenoxy ethyl-dimethyl-benzyl-ammonium chloride, myristoyl ethyl-dimethyl-benzyl-ammonium halide, and 1 hydroxyethyl-2 tetradecyl-3 benzyl ammonium chloride.

In the other group, we have the heterocyclic compounds, having the general formula

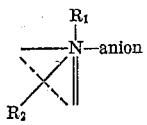

where N is an element in a heterocyclic ring, and at least one of $R_1$ and $R_2$ is a long chain substituent containing 10+ carbon atoms in the chain. Typical of this group are N-benzyl-N higher alkyl (more than ten carbon atoms) morpholinium halides, N-alkyl-dialkyl-imidazolinium chloride (with the long chain substitutent preferably on the ring, and not on the active nitrogen), the N-lauryl-methyl pyridinium chlorides, and N-lauryl-quinolinium bromide.

All of these compounds have been reacted with ammonium polyacrylate; in each case, we obtained evidence of both internal plasticization, and of germicidal activity.

A principal advantage of using synthetic ethylenic polymers in our invention, in distinction from the other film formers disclosed in our copending applications, lies in the ease with which the physical and chemical properties of our compositions can be controlled. This control can be obtained by adjusting the molecular weight of the acid polymeric component, by selecting monomers for making homo- or copolymers from a great variety of aliphatic or aromatic ethylenic nuclei, and by varying the ratio of acid to non-acid groups in the polymer. If the ratio of carboxylic or sulfonic acid is high in the polymer, the films obtained tend to be soft and flexible; if low acid ratio compounds are used, the films are hard and stiff. If the molecular weight of the polymer is high, the films tend to be strong, dry and elastic—if low molecular weight polymers are used, the films tend to be soft and sticky, and useful principally in adhesives. Thus, a wide range of physical and chemical properties can be obtained.

Still another advantage of film forming compounds derived from these polymers is the fact that they are soluble in common organic solvents.

Solubilization of our products can also be effected, in certain cases, by the use of strong solutions of hydrotropic salts, e.g. various aromatic sulfonates. From these colloidal solutions, the compounds of the invention could be recovered by the addition of more water. Examples of suitable aromatic sulfonates are sodium xylene sulfonate, sodium p-cymene sulfonate, potassium benzene sulfonate, ammonium toluene sulfonate and the like, sold under the trade name "Naxonates." Some surfactants have also been found to be solubilizers—e.g.—Igepal CA—a non-ionic surfactant obtained by condensing dodocyl phenol with about 12 mols of ethylene oxide. Solution is obtained in these cases by dissolving the solubilizer in water, and treating our compounds with the solution; swelling and eventual disintegration to a turbid solution occurs on prolonged standing and agitation.

Self-sterilizing surfaces can be conveniently prepared according to the present invention, for example by incorporating germicidal agents of the invention in paints, varnishes, waxes, polishes and the like. These germicidal agents can also be incorporated in sprays, including those for agricultural use.

The property of being soluble in organic solvents is particularly useful where additions are to be made to such products as surface coatings, waxes and the like—the germicidal compounds are really dispersed throughout the film in the finest possible subdivision, and thus yield maximum activity.

Not only can our materials be added to films of other materials, but they can, by proper selection of polymeric constituents, be used as the major film forming constituent of coatings for paper, fabrics, other unsupported films, or as paint vehicles. Such films are of course even more germicidal than compositions in which only a minor amount of our compounds are utilized. We consider such films to be another phase of our invention.

Materials and articles are said to be "self-sterilizing" when a small test piece of the article, e.g. a piece about one inch square, which has been exposed to the air for several hours, proves sterile when tested by the Food and Drug Administration sterility control test. In this test, the piece, thus contaminated by chance by airborne microorganisms, is placed on a sterilized plate containing a conventional agar medium. After incubation for 48 hours at 37° C., the test is considered positive if no growth is noticeable on or around the test piece. Treated articles are said to be antiseptic or germicidal when they give a "halo" in the Food and Drug Administration seeded agar plate test. In this test, a similar test piece of the treated article is placed on an agar plate which has been sterilized, and then inoculated with a test organism such as *M. pyogenes* var. *aureus* (also known as *Staphylococcus aureus*), or *Escherichia coli*. After incubation for 48 hours at 37° C., no growth of the inoculant should occur around a germicidal test piece, as evidenced by the maintenance of a clear zone or "halo" around the test piece.

Details of these, and other tests used in the examples, are found in the following literature:

(1) *Agar plate method.*—Described by McCulloch, E.C., Disinfection and Sterilization, pp. 472, Lea & Febiger, Philadelphia (1945), p. 193: This is a test for a variety of compounds incorporated with paper, textiles, etc. The test organism is usually *Staph. aureus* or *E. coli*.

(2) *Sterile agar plate method.*—This is a modification of the agar-plate method in which discs of filter paper impregnated with the inhibitory compound are placed upon sterile broth medium plus agar in plates. Chance inoculation is permitted by exposing the test discs on the agar medium to the air for a few minutes. Incubation periods of 3 to 7 days are employed.

(3) *Accelerated mildew infection method.*—Test Organism, *Aspergillus niger*, described in A.S.T.M. Designation D684–45T, paragraph 5: Chemically impregnated discs of filter paper placed on sterile nutrient agar in plates and inoculated with a spore suspension of *A. niger*. Incubation at 30° C. for 7 to 14 days.

(4) *Soil burial methods.*—Supplement to Federal Specification for Textiles; General Specifications, Test Methods, CCC–T–191a Supplement, October 8, 1945, sec. VIII, paragraph 4.

Also: A.S.T.M. Designation D684–45T, paragraph 13: Test specimens of duck cloth are buried for a period of 14 days.

The following examples describe in detail several embodiments of the invention, to which the invention is of course not limited.

EXAMPLE 1

To 10 cc. of a 25% aqueous solution of the ammonium salt of polyacrylic acid, used in form of a commercial product called Polyco 329, a solution of 12 g. of dimethyl-benzyl-alkyl-ammonium chloride (with the alkyl averaging $C_{12}H_{25}$) in 50 cc. water was added under stirring. A plastic product separated which could be washed free of chloride by stirring with water and decantation. This plastic product formed water-insoluble, somewhat elastic films of considerable strength. The films were not soluble in ammonia water, but swelled in benzol; they are soluble in ethyl, methyl and butyl alcohols.

In the Food and Drug Administration tests described above, these films were found self-sterilizing and antiseptic. Articles impregnated with alcohol solutions of the product were also found to be self-sterilizing.

EXAMPLE 2

50 parts of ammonium polyacrylate having an equivalent weight of 230 with respect to the carboxyl, are dissolved to a 15% aqueous solution, and reacted with 82 parts of benzyl-dimethyl-octadecyl ammonium chloride having an equivalent weight of 400, dissolved in an equal amount of water. The reaction is carried out by pouring the solution of the quaternary ammonium compound into the polyacrylate solution under continuous stirring and adjusting the pH of the reaction mixture to 9.0 by the addition of ammonia. Both solutions are heated to about 60° C. and the solution of the quaternary ammonium compound is poured into the solution of the acrylic acid salt under continuous agitation.

In the reaction a gelatinous product is formed which changes into a highly hydrated precipitate during stirring. It separates from the water phase which is then removed by filtration.

The reaction product is a soft, flexible, sticky mass, extensible and elastic. Its films are quite different from polyacrylic acid films which are brittle. This may be due to the relatively great number of quaternary ammonium radicals combining with the acid radical of the polymer.

The product is practically insoluble in water, and swells in toluene, trichlorobenzene, nitromethane, without dissolution. It is soluble in alcohols such as methanol and ethanol, and films can be obtained from these solutions. It is not dispersed in detergent solutions, such as Igepal CA, Duponol G, or in an excess of the quaternary ammonium compound.

EXAMPLE 3

50 parts by weight of ammonium polymethacrylate and 80 parts by weight of benzyl-dimethyl-octadecyl ammonium chloride having an equivalent weight of 400, are reacted in water solution. The reaction product forms a precipitate and can be processed in the manner described in Example 2.

The properties of the resulting product are similar to those of the product obtained in Example 2.

EXAMPLE 4

*Alkyl methyl benzyl dimethyl ammonium polyacrylate*

The reactants employed were Onyx oil BTC–471 ($C_{12}$ to $C_{14}$ mixed alkyl-ethyl benzyl-dimethyl ammonium chloride) and Goodrich Chemicals Goodrite 707 (a medium molecular weight ammonium polyacrylate).

19.5 grams of the quaternary salt were dissolved in 19.5 grams water.

2.8 grams of KOH were dissolved in 70 grams of methanol. The solutions were mixed; the KCl formed precipicated, yielding a 17.5% solution of the free base in dilute methanol.

The ammonium polyacrylate was made into a 15% aqueous solution; and this solution, containing 1.5 grams of the polyacrylate, was mixed with methanol solution containing 8.2 grams of free quaternary base. A voluminous, soft sticky precipitate formed. The supernatant liquid was milky, but became clear on the addition of 100 grams of water. The precipitate was then filtered, washed and dried at 80° C. The yield was 10.2 grams.

Germicidal testing 5 grams of the product was swollen in 45 grams of methanol; and 10 grams of butanol were added, and the mass went into solution. Filter paper of known weight was saturated with this solution, and the uptake weighed. The agar plate method was used.

| Active ingredient in 100 grams paper | Spec. | E. coli | | M. pyogenes v. a. | |
|---|---|---|---|---|---|
| | | Zone of inhibition in mm. after— | | | |
| | | 24 hrs. | 48 hrs. | 24 hrs. | 48 hrs. |
| Control | | 0 | 0 | 0 | 0 |
| 4.7 | 1 | 0.5 | 0.5 | 5.5 | 5.5 |
| | 2 | 0.5 | 0 | 5.0 | 5.0 |
| 2.1 | 1 | 1.0 | 1.0 | 3.4 | 3.4 |
| | 2 | 1.5 | 1.5 | | |
| 0.38 | 1 | 1.5 | 1.5 | 3.3 | 3.3 |
| | 2 | 0.5 | 0.5 | | |

Using the sterile agar plate method of random inoculation, no growth was observed after 48 hours with any of the three specimens.

EXAMPLE 5

To compare the effect of changing the quaternary ammonium compound, the polyacrylate of Example 4 was reacted with p-diisobutyl phenoxy-ethoxy-ethyl-dimethyl-benzyl ammonium chloride (Hyamine 1622, Rohm and Haas).

3.75 grams of the ammonium polyacrylate (a slight excess) in 220 grams water was mixed with
11.5 grams of the quaternary salt in
110.0 grams water.

The precipitate was filtered, washed free of chloride, and dried at 80° C. It was dry without tack, and slightly elastic, and differed considerably in appearance from the product of Example 4. Yield 11.8 grams.

2 grams of the material were dissolved in n-butanol, and the same tests made as in Example 4.

GERMICIDAL TEST

| Grams per 100 grams filter paper | Spec. | E. coli | | M. pyogenes v. a. | |
|---|---|---|---|---|---|
| | | Zone of inhibition in mm. after— | | | |
| | | 24 hrs. | 48 hrs. | 24 hrs. | 48 hrs. |
| 5 | 1 | Trace | 0 | 3 | 3 |
| | 2 | 0 | 0 | 3 | 3 |
| 1.6 | 1 | Trace | 0 | 3 | 3 |
| | 2 | 0 | 0 | 4.5 | 4 |
| 0.33 | 1 | Trace | 0 | 2.5 | 2.5 |
| | 2 | 0 | 0 | 2.5 | 2.5 |

Although no measurable zone of inhibition was reported when tested with *E. coli*, no growth on the agar plate in contact with the specimens was noted—this indicates satisfactory germicidal properties.

The sterile agar plate was also run; here again, no growth was observed after 48 hours with any of the specimens.

An accelerated mildew infection test was also run, using *Aspergillus niger* as the test organism. Using the test specimen containing 5% of our product, no growth was observed on the specimen after 3 days of test; and retardation of sporing was observed. After 6 days, there was still no growth on the specimen, but growth to the edge. This indicates mildew resistant properties.

A soil burial test was run with this product, using standard cotton duck. After 14 days' soil burial, untreated cotton duck showed severe staining and degrading; the same duck containing 1% of the reaction product of this example showed no staining or degrading; a duck containing 0.2% showed light staining and moderate degrading.

EXAMPLE 6

Solution A:                                                         Grams
  Vinyl acetate-maleic acid copolymer, 7% carboxyl, 50,000 mol. wt. (Monsanto C-3)___ 10.00
was dissolved in
  Water _____ 97.00
  27% ammonia_____ 3.00
Solution B:
  Alkyl ($C_{12}$ to $C_{14}$)-ethylbenzyl-dimethyl ammonium hydroxide _____ 0.87
was dissolved in a mixture of
  Ethyl alcohol_____ 5.00
  Water _____ 50.00

On mixing, a voluminous precipitate formed; it was washed free of excess quaternary ammonium compound by filtration; this was precipitated with a small additional quantity of solution A. The two precipitates were dried at 80° C. We obtained 9.5 grams of a tough, light yellow, somewhat elastic material, which was soluble in butanol, a 10% solution was somewhat viscous. Although the original vinyl acetate resin was a brittle solid, the reaction product was elastic and flexible, and could be used either in coatings, or in the preparation of unsupported films.

GERMICIDAL TEST

| Active ingredient in the test piece, grams in 100 grams filter paper | Test organism | | | |
|---|---|---|---|---|
| | E. coli | | M. pyogenes v. a. | |
| | Zone of inhibition in mm. after— | | | |
| | 24 hrs. | 48 hrs. | 24 hrs. | 48 hrs. |
| 3.3 | 0.2 / 0.2 | 0 / 0 | 4 / 3 | 4 / 3 |
| 1.6 | Trace / 0 | 0 / 0 | 3 / 2 | 3 / 2 |
| 0.33 | 0 / 0 | 0 / 0 | 3 / 3 | 3 / 3 |

As in Example 5, the absence of a zone of inhibition with *E. coli* was accompanied by growth inhibition in contact with the specimen, indicating germicidal action.

STERILE AGAR PLATE TEST

| Active ingredient in the test piece, grams in 100 grams filter paper | Zone of inhibition mm. after— | | |
|---|---|---|---|
| | 48 hrs. | 72 hrs. | 168 hrs. |
| 3.3 | No growth / do | Unchanged / do | Unchanged. / Do. |
| 1.6 | No growth / do | do / do | Do. / Do. |
| 0.33 | No growth / do | do / do | Do. / Do. |

An accelerated mildew test was also run, as in Example 5, using the specimen with 3.3% of our product. No growth was observed with *Aspergillus niger* after 3 days, and sporing was retarded—after 6 days, there was no growth on the specimen, but growth to the edge in the agar.

EXAMPLE 7

The quaternary ammonium salt was Onyx oil BTC-927, mixed alkyl ($C_{12}$ to $C_{14}$), dimethylbenzyl-dimethyl ammonium chloride, and the acid polymer was a styrene maleic acid copolymer (Monsanto Lustrex 810) with an acid number of 320 (mg. KOH equivalent per gram of resin)

20.0 grams Lustrex 810
380.0 grams water
6.5 grams KOH gave a solution with pH 8.3. This was mixed with a solution obtained by blending 200.0 grams of water with
81.6 grams of a 50% solution of the quaternary ammonium compound in water (as obtained commercially)

The precipitate obtained was a coherent mass. It was filtered, washed free of chlorides, and dried. Yield 49.1 grams. The product was light yellow, elastic and flexible, soluble in a 1:1 mixture of methyl ethyl ketone and isopropyl alcohol.

Tests were run, as in Examples 4, 5 and 6, using test specimens with 2, 0.5 and 0.2% of pick up. Results were as follows:

GERMICIDAL TEST

| | E. coli | | M. pyogenes v. a. | |
|---|---|---|---|---|
| | Zone of inhibition in mm. after— | | | |
| | 24 hrs. | 48 hrs. | 24 hrs. | 48 hrs. |
| Control | 0 | 0 | 0 | 0 |
| 2 | 0.2 | 0.2 | 5.0 | 5.0 |
| 0.5 | 1.5 | 1.0 | 5.0 | 5.0 |
| 0.2 | ¹0 | ¹0 | 3 | 3 |

¹ No growth over specimen.

The sterile agar plate test showed no growth for all specimens; the *Aspergillus niger* test showed inhibition of fungus growth for the 2.0% specimen, scattered growth on the 0.5% specimen.

It was found that if cotton cloth, wool cloth or paper was dipped in a 1% solution of one of the quaternary ammonium compounds used as starting material in any of the above examples and the treated fabric was then tested for germicidal activity as above described, the sterility of the fabrics was satisfactory, but uneven halos were obtained. If such samples were rinsed for 60 minutes in running water, then dried and finally tested, practically all of the quaternary ammonium compound was apparently removed and no satisfactory sterility could be found; in the use of compounds of the present invention under otherwise equal conditions, practically no such removal of the compounds takes place.

The products of our invention have as distinguishing characteristics a high molecular weight, as they are formed by reaction of quaternary ammonium compounds with polymeric reactants having a molecular weight of 2000, or more preferably up to 100,000; substantial insolubility in water, but germicidal properties in spite of this insolubility; the possibility of being solubilized in water by a few materials and rendered insoluble again; capability of forming flexible, tough films, of varying properties depending on the polymeric material chosen; and miscibility with many organic coatings.

Because of these physical and chemical properties, the products of the invention show advantages over low molecular weight germicidal quaternary ammonium compounds, such as the salts with long chain fatty acids, and their resistance to abrasion and their film-forming characteristics give increased permanence to surface coatings prepared with them. Their poor solubility in water, in soap and in ordinarily dry cleaning solvents renders them resistant to removal by washing or dry cleaning, in distinction from the salts with long chain fatty acids, which are soluble in excess soap.

This solubility in excess soap, shown by the quaternary ammonium salts of long chain fatty acids, confers one advantage which the compounds of our present invention do not possess. As pointed out in our copending application Serial No. 70,805, filed January 13, 1949 (of which this is a continuation-in-part), water soluble quaternary ammonium salts gel natural and synthetic latices instantaneously—thus 2 cc. of 50% solution of cetyl trimethyl ammonium bromide gelled 100 grams of either natural or neoprene latex at once. The stearate, made from 10 grams of the quaternary ammonium salt and 8.5 grams of potassium stearate (in alcohol), gave stable mixtures being dissolved by the soap in the latex. It was possible to prepare rubber articles from these stable latices with the additive evenly distributed.

The solubility of the quaternary ammonium salts of long chain fatty acids can be used to advantage in making foam rubber, which can be self-sterilizing if germicidal quaternary ammonium compounds are used. The salt is added to the latex, which remains stable during storage, and in the foaming operation. On heating the foamed latex, or on acidulation for coagulation the salt decomposes, and the liberated quaternary ammonium compound gets the latex in the foamed state. This is an excellent gelling technique, and at the same time insures complete distribution of the germicidal quaternary ammonium compound. However, it depends on the use of a quaternary ammonium salt which is soluble in excess soap as well as being insoluble in water—which is not the case with our compounds.

It will be understood that this invention is not limited to the compounds, process steps, solvents and other details specifically disclosed above, and that it can be carried out with various modifications. Thus, instead of the specific quaternary ammonium compounds described in the above disclosure, other quaternary ammonium compounds having germicidal properties can be used. Furthermore, in addition to those mentioned in the above disclosure, we can use other high molecular water-insoluble compounds having film-forming properties, capable of salt formation and derived from ethylenic monomers, such as other acrylic or methacrylic acid derivatives, copolymers with carboxylic acids or phenolic compounds, such as styrene maleic acid or vinyl acetate maleic acid copolymers, methyl vinyl ether maleic acid copolymer, polyvinyl sulfonates, polystyrene sulfonates. These materials should, of course, contain at least one group capable of salt formation and have a molecular weight of at least 2000, to be useful in carrying out the present invention. These and other modifications can be made without departing from the scope of the invention as defined in the appended claims.

In addition to quaternary ammonium compounds, water insoluble compounds having a germicidal effect and film-forming properties can also be obtained by reacting the above mentioned high molecular and/or polymeric acid reactants with sulfonium compounds, for example organic compounds of the type $R_3SX$ in which R is an organic radical and X is an electronegative element or radical; or with phosphonium compounds, such as quaternary phosphines, i.e. a group of organic compounds derived from phosphonium hydroxide $PH_4.OH$, by replacement of its H atoms by 4 alkyl radicals and (if desired, replacing the OH by Cl or the like; or with selenonium compounds of the formula $RSeH_3$, in which R stands for an alkyl radical; or with tellurium compounds of the type $R_3TeOH$ or $RTeH_3$, in which R stands for an alkyl radical.

While our examples have shown our materials being used alone as germicides they can obviously be combined with other germicidal agents—e.g. phenyl mercury chloride, bis(2 hydroxy-3-5-dichlorophenyl) sulfide etc., acting as carriers for them. They can be applied in admixture with other film formers, directly from organic solvent solution, or from a dispersion in strong dispersing agent, followed by a precipitation treatment with water.

We claim:

1. A film-forming composition capable of depositing self-sterilizing coatings comprising a water insoluble internally plasticized germicidal quaternary ammonium salt dissolved in a volatile organic solvent, the salt having the formula

in which $R_1$ is selected from a group consisting of hydrogen, lower alkyl and lower alkylol, $R_2$ is selected from the group consisting of lower alkyl and lower alkylol, $R_3$ is selected from the group consisting of alkyl, alkylol, aryl and aralkyl, and $R_4$ is a long carbon chain substituent with more than 10 carbon atoms in the chain and the radical A is an anionic radical having a molecular weight of at least 2000 derived from a synthetic polymer of the group consisting of homo and copolymers of ethylenically unsaturated compounds, the polymer containing an active hydrogen capable of salt formation with the quaternary compound.

2. The composition of claim 1, wherein said salt is the reaction product of dimethyl-benzyl-dodecyl ammonium halide with a water-soluble salt of polyacrylic acid.

3. The composition of claim 1, wherein said salt is the reaction product of benzyl-dimethyl-octadecyl ammonium halide with a water-soluble salt of polyacrylic acid.

4. The composition of claim 1, wherein said salt is the reaction product of benzyl-dimethyl-octadecyl ammonium halide with a water-soluble salt of polymethacrylic acid.

5. The composition of claim 1, wherein said salt is the reaction product of $C_{12}$ to $C_{14}$ alkyl-ethyl benzyl-dimethyl ammonium halide with a water-soluble salt of polyacrylic acid.

6. The composition of claim 1, wherein said salt is the reaction product of p-diisobutyl phenoxy-ethoxy-ethyl-dimethyl-benzyl ammonium chloride with a water-soluble salt of polyacrylic acid.

7. The composition of claim 1, wherein said salt is the reaction product of $C_{12}$ to $C_{14}$ alkyl-ethylbenzyl-dimethyl ammonium hydroxide with a water-soluble salt of a copolymer of vinyl acetate and maleic acid.

8. The composition of claim 1, wherein said salt is the reaction product of $C_{12}$ to $C_{14}$ alkyl-dimethylbenzyl-dimethyl ammonium chloride with a water-soluble salt of a copolymer of styrene and maleic acid.

References Cited in the file of this patent

UNITED STATES PATENTS

| | | |
|---|---|---|
| 1,984,417 | Mark et al. | Dec. 18, 1934 |
| 2,067,234 | Gordon et al. | Jan. 12, 1937 |
| 2,109,595 | Marks | Mar. 1, 1938 |
| 2,168,535 | Nusslein et al. | Aug. 8, 1939 |
| 2,234,672 | Gleason | Mar. 11, 1941 |
| 2,318,126 | Sparagen | May 4, 1943 |
| 2,346,055 | Taylor et al. | Apr. 4, 1944 |
| 2,435,777 | Glavis et al. | Feb. 10, 1948 |
| 2,617,840 | Eckert | Nov. 11, 1952 |